United States Patent
Kraus

(10) Patent No.: US 11,871,699 B2
(45) Date of Patent: Jan. 16, 2024

(54) AGRICULTURAL SYSTEM INCLUDING A SHREDDING MACERATOR AND METHOD THEREOF

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

(*) Notice: Subject to any disclaimer, the term of this patent is extended or adjusted under 35 U.S.C. 154(b) by 399 days.

(21) Appl. No.: 17/266,859

(22) PCT Filed: Aug. 14, 2019

(86) PCT No.: PCT/US2019/046487
§ 371 (c)(1),
(2) Date: Feb. 8, 2021

(87) PCT Pub. No.: WO2020/050958
PCT Pub. Date: Mar. 12, 2020

(65) Prior Publication Data
US 2021/0289704 A1 Sep. 23, 2021

Related U.S. Application Data

(60) Provisional application No. 62/728,123, filed on Sep. 7, 2018.

(51) Int. Cl.
*A01D 41/16* (2006.01)
*A01D 41/12* (2006.01)
*A01D 57/20* (2006.01)

(52) U.S. Cl.
CPC ......... *A01D 41/16* (2013.01); *A01D 41/1243* (2013.01); *A01D 57/20* (2013.01)

(58) Field of Classification Search
CPC .... A01D 41/16; A01D 41/1243; A01D 57/20; A01D 82/02; A01D 43/10
See application file for complete search history.

(56) References Cited

U.S. PATENT DOCUMENTS 2,829,587 A   4/1958  Russell
3,680,476 A * 8/1972  Pfeiffer .................... B30B 5/06
                                                      100/118

(Continued)

FOREIGN PATENT DOCUMENTS

CA   2133544 A1   4/1996
CN   1148930 A    5/1997

(Continued)

OTHER PUBLICATIONS

Extended European Search Report and Written Opinion issued in European Patent Application No. 19857338.8, dated May 3, 2022, in 08 pages.

(Continued)

*Primary Examiner* — Arpad F Kovacs
(74) *Attorney, Agent, or Firm* — Taft Stettinius & Hollister LLP; Stephen F. Rost

(57) ABSTRACT

An agricultural machine includes a chassis, a crop-cutting member coupled to the chassis; and a crop-conditioning member coupled to the chassis and positioned rearward of the crop-cutting member. The crop-conditioning member includes a first macerator assembly and a second macerator assembly. The first macerator assembly includes a first roll configured to rotate about a first rotational axis, a second roll configured to rotate about a second rotational axis, and a first endless member surrounding and engaged with the first roll and the second roll. The second macerator assembly is spaced apart from the first macerator assembly; and a maceration zone is defined between the first macerator assembly and the second macerator assembly. The endless (Continued)

member rotates to macerate crop disposed between the first macerator assembly and the second macerator assembly.

20 Claims, 7 Drawing Sheets

(56) References Cited

U.S. PATENT DOCUMENTS

| | | | |
|---|---|---|---|
| 4,068,453 A * | 1/1978 | Hill | A01D 43/105 56/14.4 |
| 4,109,448 A | 8/1978 | Kline | |
| 4,185,786 A | 1/1980 | Kline | |
| 4,265,076 A | 5/1981 | Krutz | |
| 4,325,209 A | 4/1982 | Cicci | |
| 4,332,125 A | 6/1982 | Holdren | |
| 4,445,313 A * | 5/1984 | Elliott | A01D 43/10 56/DIG. 1 |
| 4,912,914 A * | 4/1990 | Wingard | A01D 43/003 56/10.8 |
| 5,036,652 A | 8/1991 | Schmittbetz et al. | |
| 5,152,127 A | 10/1992 | Koegel et al. | |
| 5,326,320 A * | 7/1994 | von Allwoerden | A01D 43/10 460/149 |
| 5,379,580 A * | 1/1995 | Gropp | A01D 43/00 56/192 |
| 5,630,313 A | 5/1997 | Von Allworden et al. | |
| 5,894,716 A * | 4/1999 | Haldeman | A01D 43/10 56/16.4 B |
| 5,950,406 A | 9/1999 | Koegel et al. | |
| 6,029,432 A | 2/2000 | Kraus et al. | |
| 6,032,446 A * | 3/2000 | Gola | A01F 15/00 100/88 |
| 6,052,975 A | 4/2000 | Kraus | |
| 6,055,799 A | 5/2000 | Savoie et al. | |
| 6,058,689 A * | 5/2000 | Kraus | A01D 43/00 56/16.4 B |
| 6,062,010 A * | 5/2000 | Kraus | A01D 43/00 56/16.4 B |
| 6,101,797 A | 8/2000 | Koegel et al. | |
| 7,059,108 B1 * | 6/2006 | Rosenbalm | A01D 82/00 56/16.4 R |
| 7,726,108 B1 * | 6/2010 | Pruitt | A01D 61/004 56/6 |
| 8,006,470 B2 * | 8/2011 | Pruitt | A01D 43/10 56/16.4 B |
| 8,984,851 B2 * | 3/2015 | Pruitt | A01D 43/107 56/16.4 R |
| 2004/0255566 A1 | 12/2004 | Phillips et al. | |
| 2014/0102067 A1 * | 4/2014 | Barnett | A01D 43/10 56/16.4 C |
| 2018/0213722 A1 | 8/2018 | Pratt et al. | |
| 2019/0191627 A1 * | 6/2019 | Mosel | A01D 43/00 |

FOREIGN PATENT DOCUMENTS

| | | | | |
|---|---|---|---|---|
| CN | 207167115 U | | 4/2018 | |
| CN | 109005930 A | * | 12/2018 | A01D 82/00 |
| DE | 4229060 A1 | | 3/1994 | |
| EP | 0205206 A1 | * | 12/1986 | A01D 82/00 |
| WO | WO-03005802 A1 | * | 1/2003 | A01D 82/00 |

OTHER PUBLICATIONS

International Search Report, PCT/US2019/046487, U.S. Patent Office, dated Nov. 1, 2019, 3 pages.

Written Opinion of the International Searching Authority, PCT/US2019/046487, U.S. Patent Office, dated Nov. 1, 2019, 6 pages.

* cited by examiner

AGRICULTURAL SYSTEM INCLUDING A SHREDDING MACERATOR AND METHOD THEREOF

CROSS-REFERENCE TO RELATED APPLICATION

This application is a 371 national stage application claiming the benefit of International Application Ser. No. PCT/US2019/046487, filed Aug. 14, 2019, which claims the benefit of U.S. Provisional Application No. 62/728,123, filed Sep. 7, 2018, the contents of which are hereby incorporated herein by reference in their entirety.

FIELD OF THE DISCLOSURE

The present disclosure relates to an agricultural system for processing crop, and in particular to an agricultural system inclusive of a shredding macerator for processing the crop and method thereof.

BACKGROUND OF THE DISCLOSURE

In the agricultural industry, crop processors and forage macerators have been used in the past to increase forage digestibility characteristics and forage drying rates. Most conventional crop processors may be used to macerate the crop passing between a pair of serrated rolls which are in close proximity to one another. As the crop passes through the crop processor, the crop is macerated due to the rolls operating at differential speeds which creates a shearing effect on the crop.

Conventional crop processors or roll shredding macerators, however, are designed such that the crop passing between the rolls is in contact therewith for a minimal amount of time. As such, the degree of maceration is small and the improved digestibility characteristics is limited. While recent developments in the industry may include additional sets of rolls, the amount of time the crop is macerated is still very short. Moreover, additional rolls increases the complexity of the system and often requires the machines to be much larger and therefore more expensive.

Thus, there is a need for an improved maceration process and macerating system to increase the amount of time crop is macerated without the complexity and expense of conventional systems.

SUMMARY

In one embodiment of the present disclosure an agricultural machine includes a chassis, a crop-cutting member coupled to the chassis, a crop-conditioning member coupled to the chassis and positioned rearward of the crop-cutting member, wherein the crop-conditioning member includes a first macerator assembly including: a first roll configured to rotate about a first rotational axis, a second roll configured to rotate about a second rotational axis, and a first endless member surrounding and engaged with the first roll and the second roll.

In some embodiments, the agricultural machine includes a second macerator assembly spaced apart from the first macerator assembly; and a maceration zone bounded by the first endless member and the second macerator assembly; wherein the first endless member is configured to rotate relative to the second macerator assembly to macerate crop disposed between the first endless member and the second macerator assembly. The maceration zone defines a continuous passageway extending the distance between the first rotational axis and the second rotational axis. The continuous passageway includes a first end defining an inlet of the passageway adjacent the first rotational axis, and a second end defining an outlet of the passageway adjacent the second rotational axis.

In some embodiments, the first roll has a first diameter, and the second roll has a second diameter smaller than the first diameter. In some embodiments, the maceration zone is arc-shaped. In some embodiments, the first roll and the second roll are configured to rotate in a first direction, and the second macerator assembly is a drum configured to rotate in a second direction opposite the first direction. In some embodiments, maceration zone is rectangular. In some embodiments, the maceration zone is wedge-shaped. In some embodiments, the maceration zone includes a rectangular portion and a wedge-shaped portion adjacent the rectangular portion. In some embodiments, the inlet of the continuous passageway is defined in the wedge-shaped portion of the maceration zone, and the outlet of the continuous passageway is defined in the rectangular portion of the maceration zone.

In some embodiments, the first macerator assembly includes a support frame that includes a first end and a second end, wherein: the support frame is positioned between the first roll and the second roll, and the support frame is surrounded by and configured to engage the first endless member. In some embodiments, the support frame is configured to engage the first endless member at one or more discrete locations of the support frame. In some embodiments, the support frame includes a first substantially linear portion configured to engage the first endless member, the support frame includes a second substantially linear portion configured to engage the first endless member, and the second substantially linear portion is disposed at an angle relative to the first substantially linear portion.

In some embodiments, the second macerator assembly is substantially identical to the first macerator assembly. In some embodiments, the second macerator assembly is a mirror image of the first macerator assembly across a center line extending through the length of the zone of maceration.

In another embodiment of the present disclosure, a crop-conditioning member for use with an agricultural machine includes: a first macerator assembly including: a first roll configured to rotate about a first rotational axis, a second roll configured to rotate about a second rotational axis, and a first endless member surrounding and engaged with the first roll and the second roll; a second macerator assembly spaced apart from the first macerator assembly; and a maceration zone bounded by the first endless member and the second macerator assembly; wherein the first endless member is configured to rotate relative to the second macerator assembly to macerate crop disposed between the first endless member and the second macerator assembly. In some embodiments, the maceration zone defines a continuous passageway extending from an inlet defined adjacent to the first rotational axis to an outlet defined adjacent to the second rotational axis.

In another embodiment of the present disclosure, a method of macerating a crop includes: rotating a first endless member of a first macerator assembly around a first roll having a first axis of rotation and around a second roll having a second axis of rotation; advancing the crop into a maceration zone, wherein: the maceration zone is bounded by the first endless member and a second macerator assembly spaced apart from the first endless member, and the maceration zone extends the distance between the first axis of rotation and the second axis of rotation; and contacting the crop with the first endless member and the second macerator assembly in the maceration zone.

In some embodiments, the method includes removing the first endless member from the first macerator assembly; arranging a second endless member to surround and engage the first roll and the second roll; and rotating the second endless member around the first roll and the second roll. In some embodiments, the method includes removing the first endless member from the first macerator assembly; performing maintenance on the first endless member, and repositioning the first endless member around the first roll and the second roll.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

In this disclosure, the term "crop" is used broadly throughout and may refer to forage or any other consumable product that may be harvested and macerated.

Figure 1:
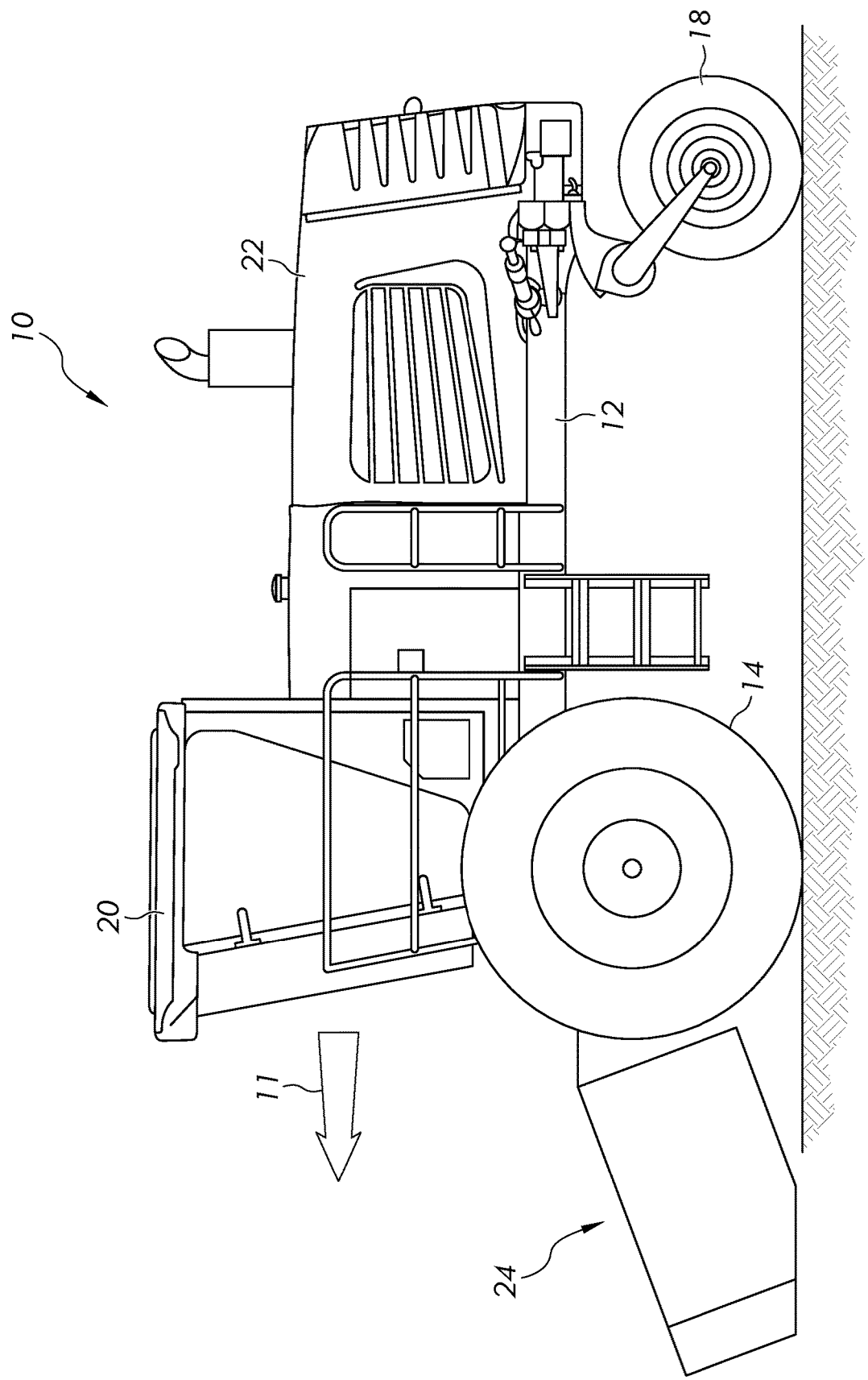
FIG. 1 is a side elevational view of a windrower including a tractor coupled to a mower conditioner.

Crop processors and forage macerators may be disposed in a crop harvesting machine such as the one illustrated in FIG. 1. Here, a side elevational view of a self-propelled crop harvesting machine 10 is shown being operable to cut and collect standing crop in a field, condition the cut crop as it moves through a mower conditioner machine to improve its drying characteristics, and then return the cut and conditioned crop material to the field in a windrow or swath. The crop harvesting machine is also known as a mower conditioner or a windrower. The crop harvesting machine 10 moves along the field in a working direction 11. The crop harvesting machine 10 includes a main frame 12 supported on driven right and left front wheels, of which only the left front wheel 14 (with respect to the operator) is shown and on right and left caster mounted rear wheels, of which only a left rear wheel 18 is shown. A cab 20 is mounted on a forward end of the frame 12, and a housing 22 within which is located a prime mover (not shown), such as an internal combustion engine, is mounted on the frame 12 behind the cab 20.

A harvesting header 24 is coupled to and supported by the forward end of the frame 12. Operator controls (not shown) are provided in the cab 20 for operation of the crop harvesting machine 10, including the attached harvesting header 24. The harvesting header, in one embodiment, includes one or more ground engaging devices, such as one or more skid shoes or wheels (not shown), to support the harvesting header 24 during movement across a field. In one embodiment, the harvesting header does not include a traction drive. All of its power comes from the windrower traction unit or the tractor.

Figure 2:
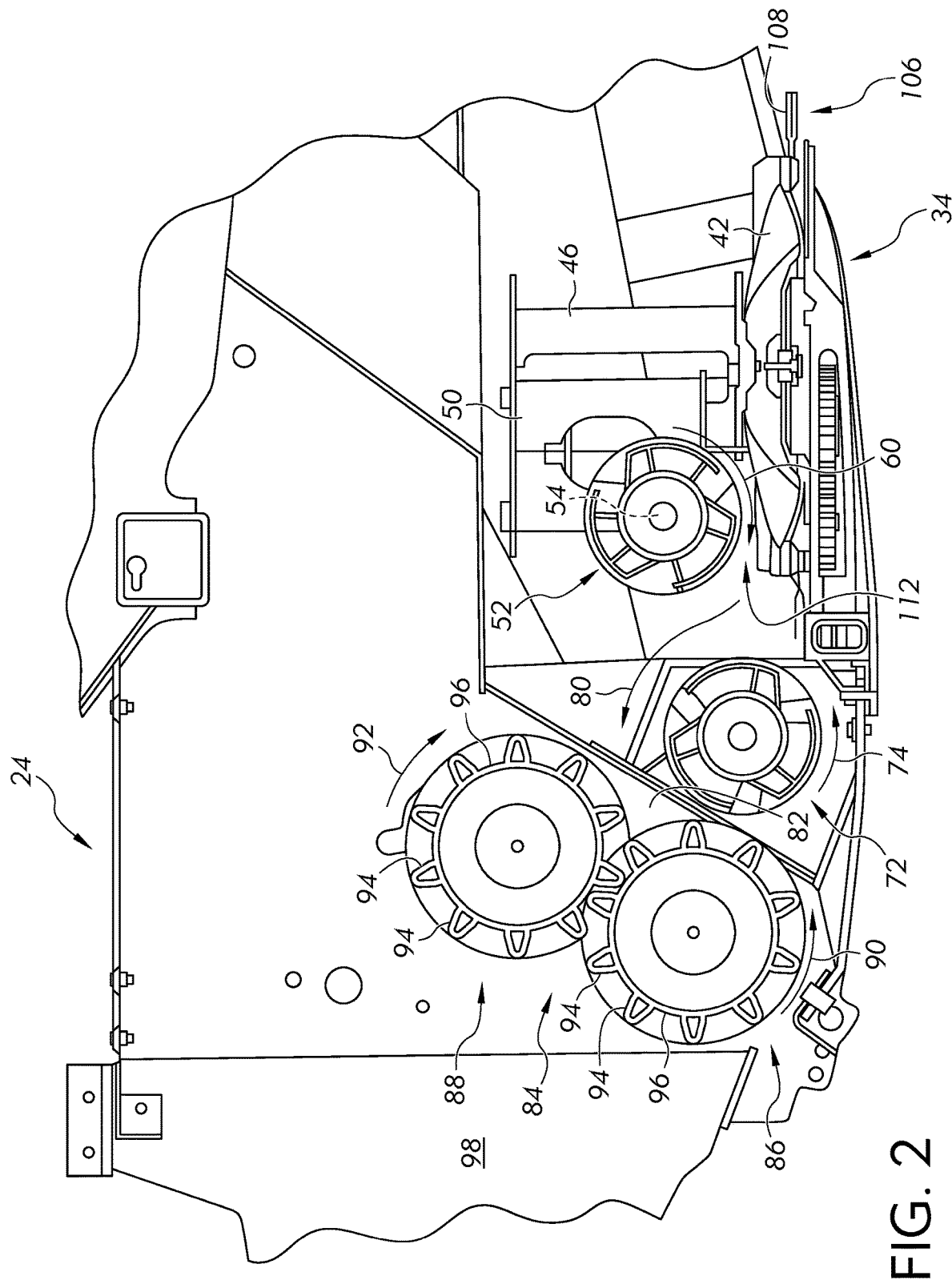
FIG. 2 is a side elevational view of a crop harvesting machine.

The harvesting header 24 is shown in greater detail in FIG. 2. Here, the header 24 includes a frame or chassis to which crop cutting and conditioner elements are coupled. The crop cutting element may be referred to as a crop-cutting member and the crop conditioner element may be referred to as a crop-conditioning member. As illustrated, the harvesting header 24 extends along a direction which defines a crop cutting width provided by a cutterbar 34. The cutterbar 34 is transverse with respect to the moving direction 11 of the windrower 10 of FIG. 1. In one embodiment, the cutterbar 34 is aligned substantially perpendicularly to the moving direction 11 of the windrower 10. In other embodiments having a separable mower conditioner, the mower conditioner is either pushed or pulled by a tractor such that the cutterbar 34 is operated generally perpendicularly to the direction of travel and either parallel to the ground or with the front edge of the cutterbar tipped lower than the back edge. During operation, as the harvesting header 24 moves in the moving direction 11, crop (not shown) is cut at a leading edge 106 by a plurality of rotary cutter knives 108.

The cutterbar 34 may include a substantially planar support member which extends from one side of the frame to another side thereof. The support member is configured to support a plurality of rotary cutters 42, each of which is supported by the support member for rotation about respective centers each defining a rotational axis. The plurality of rotary cutters 42 define a rotary cutter zone which extend longitudinally along the cutter bar 34 in which crop is cut, and cut crop moves across the rotary cutters 42.

At one end of the cutterbar 34, a converging drum 46 is located above a rotary cutter 42. Similarly, but not shown, a second converging drum may be located on the other side of the cutterbar 34 such that each of the converging drums are operatively connected to the respective rotary cutters 42A and 42B. As such, the converging drums move in the same rotational directions as the respective rotary cutter 42A and 42B.

As shown in FIG. 2, a third converging drum 50 is located adjacently to the converging drum 46 and rotates in the same direction as the converging drum 46. Similarly, a fourth converging drum may be located on the other side of the cutterbar 34 from what is illustrated in FIG. 2. The converging drum 50 may be driven by a belt (not shown) which operatively couples the drum 50 to its adjacent drum 46. Due to the rotation of the converging drums, crop cut toward the sides of the cutterbar 34 is directed toward the middle or centerline of the header 24.

An undershot rotating auger 52 is supported by the frame for rotational movement about a rotational axis 54 along direction 60, as shown in FIG. 2. The undershot rotating auger 52 includes a length which extends along the longitudinal direction and between the converging drum 50 on one side of the cutterbar 34 and the corresponding drum on the other side. The undershot rotating auger 52 may include one or more flightings for moving crop towards the centerline and into a space 112 between the auger 52 and a paddle section (not shown). Cut crop, therefore, is moved away from the converging drum 50 toward the centerline X by the undershot rotating auger 52 where it is pushed toward the rear of the rotary cutters 42 by paddles of the paddle section and further toward an overshot rotating auger 72.

The overshot rotating auger 72 of FIG. 2 is supported by the frame for rotational movement in a direction 74 which is opposite the rotational direction 60 of the undershot rotating auger 52. The overshot rotating auger 72 includes crop movement features of the same type as the undershot rotating auger 52. The opposed rotations of undershot rotating auger 52 and overshot rotating auger 72 move the cut crop between the two augers 52 and 72 along a path 80 as shown in FIG. 2. The path 80 extends toward an interface 82 located at a conditioner element 84, which in the illustrated embodiment includes a first conditioner roll 86 and a second conditioner roll 88.

The first conditioner roll 86 moves in a direction 90 which is opposite a direction 92 of the second conditioner roll 88. Each of the conditioner rolls 86 and 88 include a plurality of extensions or splines 94 extending from a cylindrical portion 96. The splines 94 of one roll 86 mesh with the splines 94 of the other roll 88 such that the cut crop moving along the path 80 and into the interface 82 is conditioned by pressing, crushing, or breaking the cut crop to reduce the rigidity of the cut crop, as well as to remove or at least release a waxy outer layer which can be found in the cut crop depending on the type of cut crop being conditioned. After cutting, the crop is conditioned by passing between the first roll 86 and the second roll 88 and out a back portion 98 of the harvesting header 24 (or mower conditioner). The cut crop then moves to the field where it remains until use or collection.

The crop harvesting machine is shown and described above as a self-propelled windrower or mower conditioner machine. The teachings and principles of the present disclosure, however, may be applied to another crop harvesting machine such as a baler. Moreover, this disclosure is not intended to be solely limited to a crop harvesting machine. Other work machines in the agricultural industry that may utilize a macerator system as disclosed herein are contemplated by this disclosure.

In the crop harvesting process, it may be desirable to place a macerator at a location after the crop is cut. For example, in the embodiment of the self-propelled harvesting machine of FIGS. 1 and 2, a crop processor or crop-conditioning member may be positioned rearward of the cutterbar 34 and rotary cutters 42. As described, the crop processor can macerate or shred the crop passing therethrough in order to increase the forage digestibility characteristics and drying rates. An example of a conventional roll shredding macerator is illustrated in FIG. 3.

Figure 3:
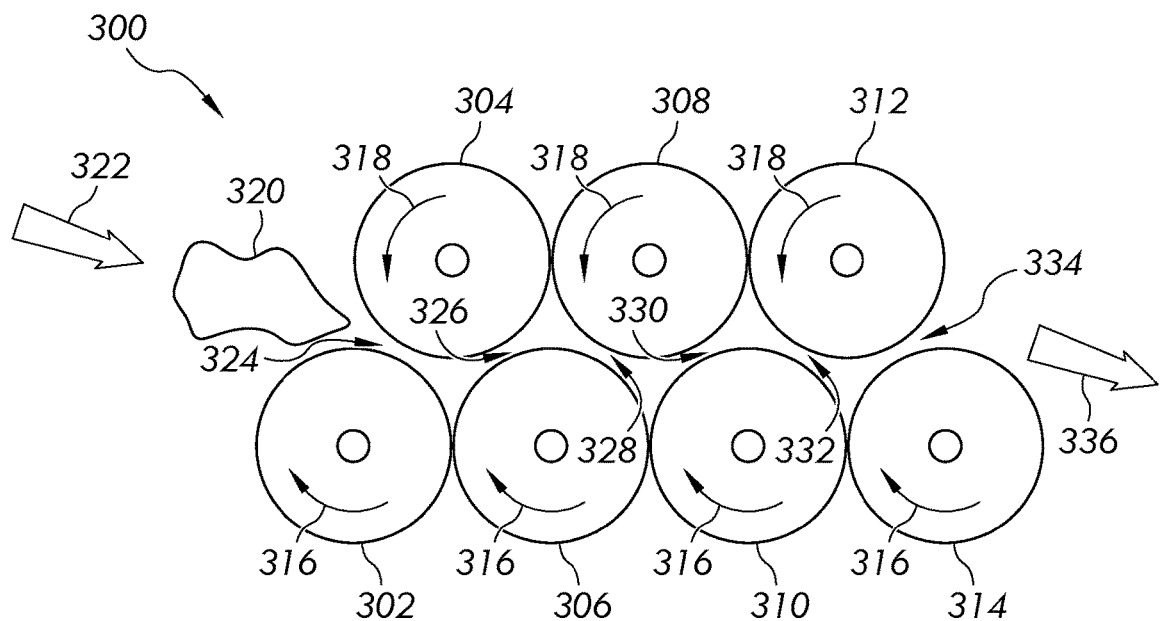
FIG. 3 is a schematic of a conventional roll shredding macerator.

Referring to FIG. 3, a conventional roll shredding macerator (RSM) is shown. The RSM 300 may include a plurality of rolls that are rotatably driven at various speeds and directions for macerating an incoming crop 322. The crop 322 may enter the RSM 300 at an inlet 322 and exit via an outlet 336. The plurality of rolls may include a first roll 302, a second roll 304, a third roll 306, a fourth roll 308, a fifth roll 310, a sixth roll 312, and a seventh roll 314. As shown, the second, fourth and sixth rolls are positioned above the first, third, fifth and seventh rolls. Moreover, the second, fourth and sixth rolls rotate in a counterclockwise direction 318, whereas the first, third, fifth, and seventh rolls are rotatably driven in a clockwise direction 316.

As the crop 320 flows into the RSM 300, it is shredded in a maceration zone defined between the inlet 322 and the outlet 336. In particular, the crop 320 is pinched or shredded at a first maceration location 324 located between the first and second rolls, a second maceration location 326 located between the second and third rolls, a third maceration location 328 between the third and fourth rolls, a fourth maceration location 330 between the fourth and fifth rolls, a fifth maceration location 332 between the fifth and sixth rolls, and a sixth maceration location 334 between the sixth and seventh rolls. As shown, the clearance at each of the aforementioned maceration locations is minimal in order that the crop is shredded by the pair of rolls. As noted above, the underlying issue or problem with the conventional RSM 300 of FIG. 3 is that the crop resides in each maceration zone for a very limited amount of time. After the crop exits one maceration zone, it is allowed to expand before it enters another maceration zone. As a result, the degree of maceration is limiting in view of this design.

Figure 4:
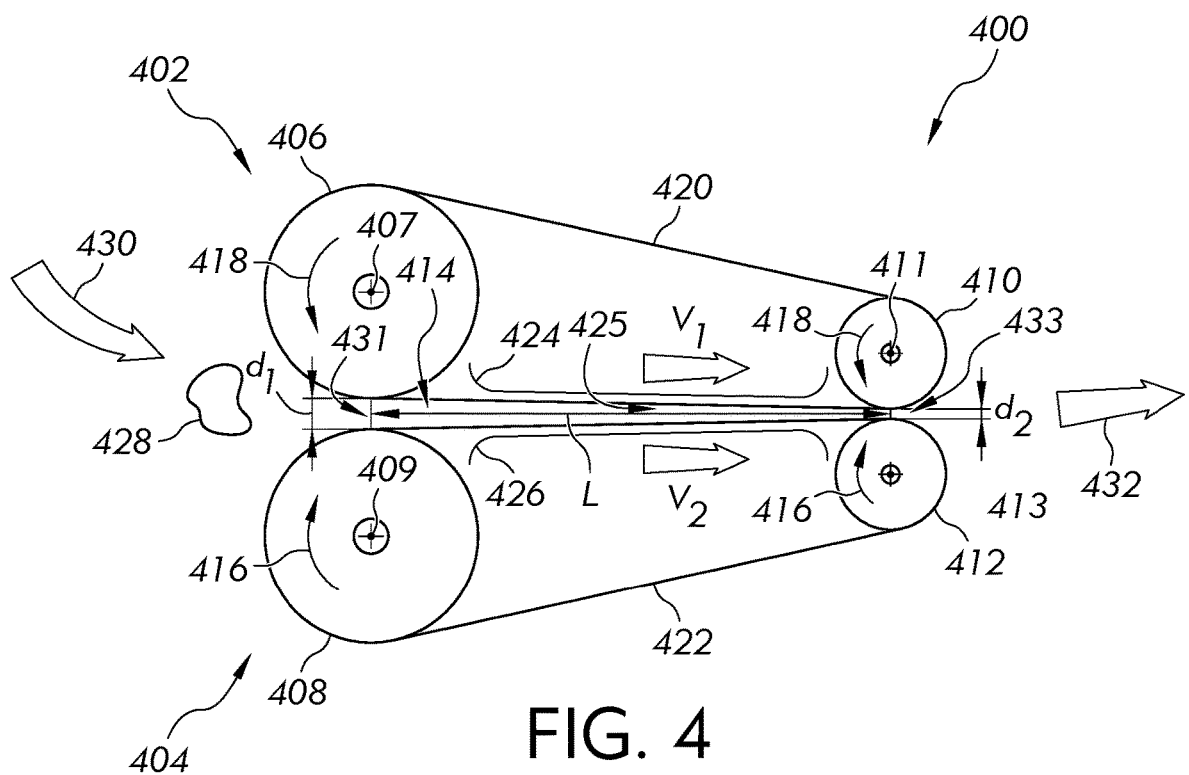
FIG. 4 is a schematic of a belt shredding macerator.

Turning to FIG. 4, a different embodiment of a macerator is shown. Here, a belt shredding macerator system 400 is illustrated having a first or upper macerator assembly 402 and a second or lower macerator assembly 404. The macerator system 400 may include an inlet side 430 in which a piece of crop 428 enters and an outlet side 432 through which the crop 428 exits. In this embodiment, each macerator assembly may include at least two rolls, gears, drums, pulleys, or the like, and a belt operably driven in-between. For example, in FIG. 4, the first macerator assembly 402 may include a first inlet roll 406 and a first outlet roll 410. Moreover, a drive belt 420 may surround both rolls as shown. The drive belt 420 may be engaged with the rolls 406, 410 such that the drive belt 420 moves or rotates around the rolls 406, 410 at a first speed or velocity, $V_1$ when the rolls 406, 410 rotate. Likewise, the second macerator assembly 404 may include a second inlet roll 408 and a second outlet roll 412, with a second drive belt 422 surrounding and engaged with the rolls 408, 412. The second drive belt 422 moves or rotates around the rolls 408, 412 at a second speed or velocity, $V_2$ when the rolls 408, 412 rotates.

In the illustrated embodiment of FIG. 4, either the inlet roll or outlet roll may be operably driven by a motor, engine, prime mover, or other means. For example, both inlet rolls may be drive gears that are operably driven by a drive shaft coupled to a motor. In a further example, the inlet or outlet rolls may be driven by a power take-off (PTO) from a tractor or other vehicle. Any number of ways may be incorporated into the principles and teachings of this disclosure for powering the macerator system of FIG. 4 (and other embodiments).

As shown in FIG. 4, the first inlet roll 406 is configured to rotate about a first rotational axis 407, the first outlet roll 410 is configured to rotate about a second rotational axis 411, the second inlet roll 408 is configured to rotate about a rotational axis 409, and the second outlet roll 412 is configured to rotate about a rotational axis 413. The first inlet roll 406 and first outlet roll 410 may be operably rotated in a first direction 418, and the second inlet roll 408 and second outlet roll 412 may be operably rotated in a second direction 416. In FIG. 4, the first direction 418 may correspond with a counterclockwise direction, whereas the second direction 416 may correspond with a clockwise direction.

In this embodiment, the shredding macerator system 400 may further include support frames for removing or reducing any slack in the drive belts. In FIG. 4, the first macerator assembly 402 may include a first support frame 424 and the second macerator assembly 404 may include a second support frame 426. Each support frame may be designed in any known way. In the illustrated embodiment, the support frames are structured as a longitudinal plate that extends a distance between the input and output rolls. Each belt may come into contact with the frames during operation. In some instances, the belts may be in continuous contact with the support frames.

As crop 428 is fed into the macerator system 400 via the inlet direction 430, it enters a maceration zone 414 defined by length, L, between the inlet rolls and outlet rolls. The maceration zone 414 is bounded by the belt 420 of the upper macerator assembly 402 the belt 422 of the lower macerator assembly 404. The maceration zone 414 defines a continuous passageway 425 extending the distance between the first rotational axis 407 and the second rotational axis 411. The passageway includes a first end defining an inlet 431 of the passageway 425 adjacent the first rotational axis 407 and second end defining an outlet 433 of the passageway 425 adjacent the second rotational axis 411.

In the maceration zone 414 of FIG. 4, the crop 428 is effectively shredded or macerated during its entire travel through the zone 414. In FIG. 3, the conventional system is arranged such that the crop is effectively macerated only at each "nip" or location where it is compressed between a pair of rollers. By contrast, in FIG. 4, the crop may be effectively macerated along the entire maceration zone 414.

The maceration zone 414 of FIG. 4 may include a few characteristics that improve or boost the level of maceration that occurs therein. First, the speed or velocity, $V_1$, of the first maceration belt 420 may be different from the speed or velocity, $V_2$, of the second maceration belt 422. This differential speed may be controlled to achieve the desired level of maceration. If the differential speed is minimal, then the crop may not be macerated as much as when the differential speed is greater. Thus, a control system may be part of the system 400 in which a controller (not shown) operably controls the longitudinal speed of both belts in the maceration zone 414.

Second, both inlet rolls may have a larger diameter than the outlet rolls. Alternatively, it may be possible for only one of the two inlet rolls to have a larger diameter. In FIG. 4, the larger inlet roll diameter can make it easier to feed crop into the macerator system 400. Moreover, the smaller diameter outlet rolls can allow for the removal of any crop that sticks or otherwise becomes caught on either belt at the outlet 432. As the belt moves around the smaller diameter outlet rolls, the flex or fluctuation of the belts can assist with removing the crop therefrom. As a result, the difference in diameters between the inlet and outlet rolls can assist with feeding the crop at the inlet 430 and discharging it at the outlet 432.

Another feature of the maceration system 400 of FIG. 4 is the distance or clearance between the first belt 420 and second belt 422. In FIG. 4, a first clearance at the inlet rolls 406, 408 is represented as $D_1$ and a second clearance at the outlet rolls 410, 412 is represented as $D_2$. The first clearance may be greater than the second clearance such that the maceration zone 414 progressively narrows to form a wedge-like shape from the inlet 430 to the outlet 432. In this design, the crop 428 is exposed to two abrading surfaces or belts which are in close proximity to one another for a relatively large surface area or longitudinal distance compared to a single nip. In this manner, the system 400 of FIG. 4 may be referred to as a large surface area macerator having an endless, textured maceration surface for macerating crop.

In addition to the clearance between the belts, another characteristic of the maceration system 400 of FIG. 4 is the increased surface area of the maceration zone. As described above, the maceration zone 414 has a defined length, L, and the longer this length is the greater opportunity for maceration exists. In other words, not only is it desirable to have a longer length, but the greater length further allows for additional abrading time of the crop 428 between the belts.

An additional feature of the system 400 of FIG. 4 which can impact maceration is the grit texture of the first and second drive belts. For example, if the belts have a fine texture, then the crop 428 may experience less maceration. If, however, the belts have a more coarse texture, then the crop 428 may be exposed to greater maceration.

The amount of force applied to the crop 428 passing through the maceration zone 414 by the first belt 420 and second belt 422 can also impact maceration. The first and second support frames, for example, can limit or reduce flexing or sagging of the belts during operation to maintain a compressive force on the crop. If a greater force is applied to the crop 428 passing through the maceration zone 414, then more cells of the crop 428 will be sheared or abraded once it exits via the outlet 432.

The first and second belts 420, 422 may come into contact at one or more locations along their length with the respective support frame 424, 426 to further give shape to each belt. For example, each belt may come into contact along the entire length of the respective support frame. In other examples, the belt may only come into contact at one or more locations along the length of the support frame. Further, the surface of the respective support frame may comprise a low friction material to help smooth travel of the belt along the frame. In other instances, the belt may be formed of a lower friction material as well. This may also be the case with the first belt 420 and the first support frame 422.

Alternatively, the crop may be processed along the length of the maceration zone 414 because the belts 420, 422 are supported between the drive and idler rolls (i.e., input and output rolls) by low-friction platens, which may be similar to the support frames in FIG. 4. Linear velocity and belt clearance can be adjustable to alter the maceration level.

The macerator configuration of FIG. 4 has several potential advantages over the conventional RSM 300 of FIG. 3. For example, the system 400 may have fewer moving components while providing considerably greater processing area. In the RSM 300, the crop mat expands after each nip and then must be recompressed as the mat passes to the next nip. Compressing and releasing the mat is inefficient, so the continuous compaction of the belt shearing macerator system 400 can be more energy efficient. Moreover, the belts may be heavy-duty industrial abrasive belts that are commercially available and which may be cost effective and easily replaceable. With the RSM 300, the rolls must be re-machined in order to resurface them, which can be very costly. In addition, because the commercial belts are readily available, different textures (or grits) may be used for different crop types with the macerator system 400 of FIG. 4.

Figure 8:
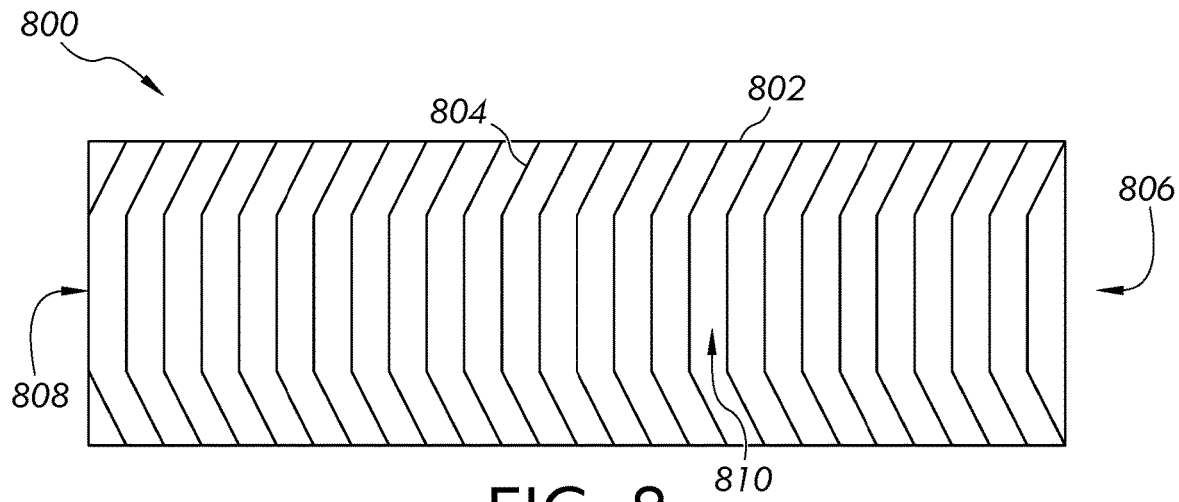
FIG. 8 is a top view schematic of a belt having a pattern for directing crop laterally.
Figure 9:
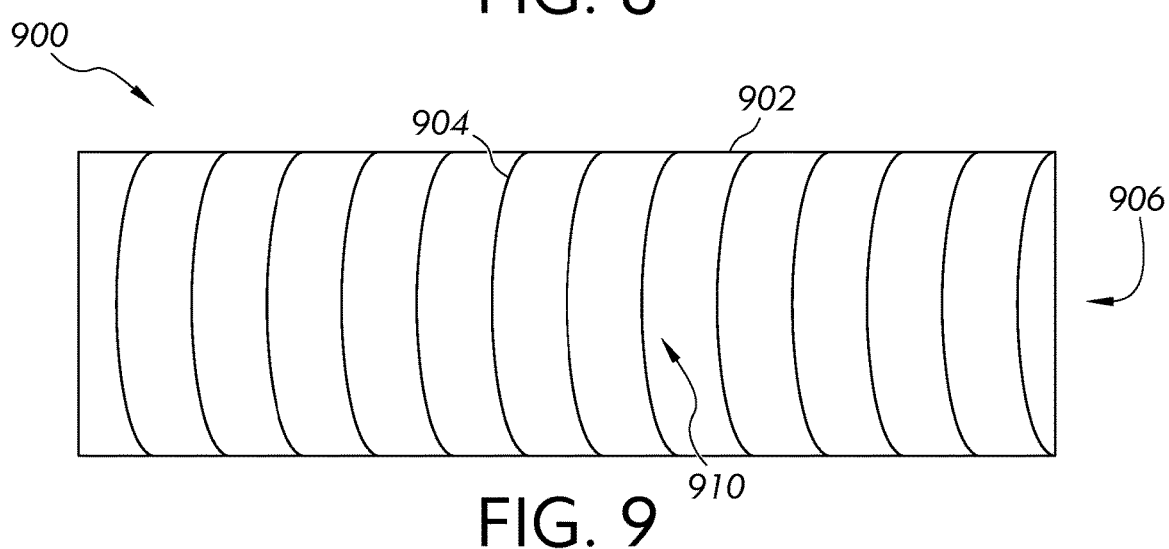
FIG. 9 is a top view schematic of a belt having another pattern for directing crop laterally.
Figure 10:
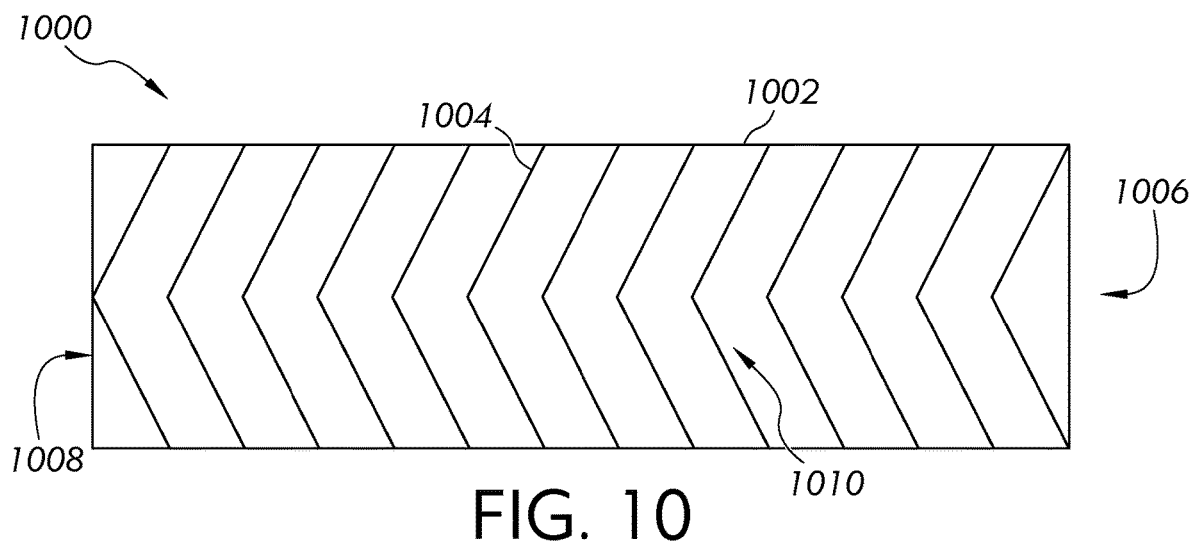
FIG. 10 is a top view schematic of a belt having a further pattern for directing crop laterally.

It may also be possible for one or both of the two belts to be formed with a pattern to direct crop towards the middle or center thereof. In FIGS. 8-10, several examples of this are shown. In FIG. 8, for instance, a belt 800 in the form of a conveyor or carrier belt is shown. This belt 800 may be part of the lower, second macerator assembly 404 of FIG. 4. In any event, the belt 800 may include a pattern 802 formed in the belt material for directing crop material that enters at an inlet 804 and travels to an exit 806 to move towards a center or middle portion 810 thereof.

Moreover, in one embodiment, the upper, abrasive belt 420 of the first macerator assembly 402 may include a pattern formed therein similar to that of belt 800.

During operation, the upper, abrasive belt 420 may be operably driven at a differential speed compared to that of the lower, patterned belt 422. If the upper, abrasive belt 420 is driven at a faster speed than the lower, patterned belt 422, the crop material 428 may be moved inwardly towards the center of the lower belt 422 (or center of the maceration zone 414). If the lower, patterned belt 422 is driven at a faster speed than the upper, abrasive belt 420, the crop material 428 may be more evenly spread out across the width of the belts and maceration zone 414. As the crop is more evenly spread, the mat of crop material may be made thinner which may improve the level of maceration.

It is also possible that the patterned belt may comprise abrasive material embedded on the "higher surfaces" of the belt. In FIG. 8, for example, the pattern 802 may form channels in the belt material, whereas the surfaces of the belt that do not form the channels may include abrasive material.

In FIG. 9, a different embodiment of a belt 900 in the form of a conveyor or carrier belt is shown. Here, the belt 900 may include a different, arc-shaped pattern 902 for directing crop towards a center portion 910 thereof. Thus, as the crop is transported from an inlet side 906 to an outlet side 908, the belt pattern 902 may assist with moving the crop towards the center portion 910.

Referring to FIG. 10, a further embodiment of a belt 1000 is shown. The belt 1000 may too be a conveyor or carrier belt. The belt 1000 may include a different pattern 1002 for assisting with moving the crop inwardly toward a center portion 1010 thereof. Again, the crop enters via an inlet 1006 and travels to an outlet 1008 of the system.

While three different examples are shown in FIGS. 8-10, it is to be understood that these are only intended to represent non-limiting examples of a belt pattern. Other patterns that assist with moving crop towards a center portion of the belt may be contemplated by this disclosure. Moreover, these patterned belts can assist with preventing or reducing the likelihood of crop falling off the belts. Moreover, the crop may roll laterally inwardly toward the center of the belt, and as it does, the crop material may be subjected to maceration along two-dimensions or directions (i.e., in the lateral and longitudinal directions). The two directions of shear may improve fiberization of the crop material. Although not shown, the top belt or the belt 420 of the first macerator system 402 may comprise sand paper or the like.

As described with respect to FIGS. 4 and 8 above, the embodiments of FIGS. 9 and 10 may also include belts with both patterns and abrasive surfaces. Further, the belts 900, 1000 may also be used in combination with another belt such that the pair of belts are operated at differential speeds to either assist with moving the crop inwardly toward a center portion or spreading the crop more evenly across a width of the maceration zone to improve maceration.

Figure 5:
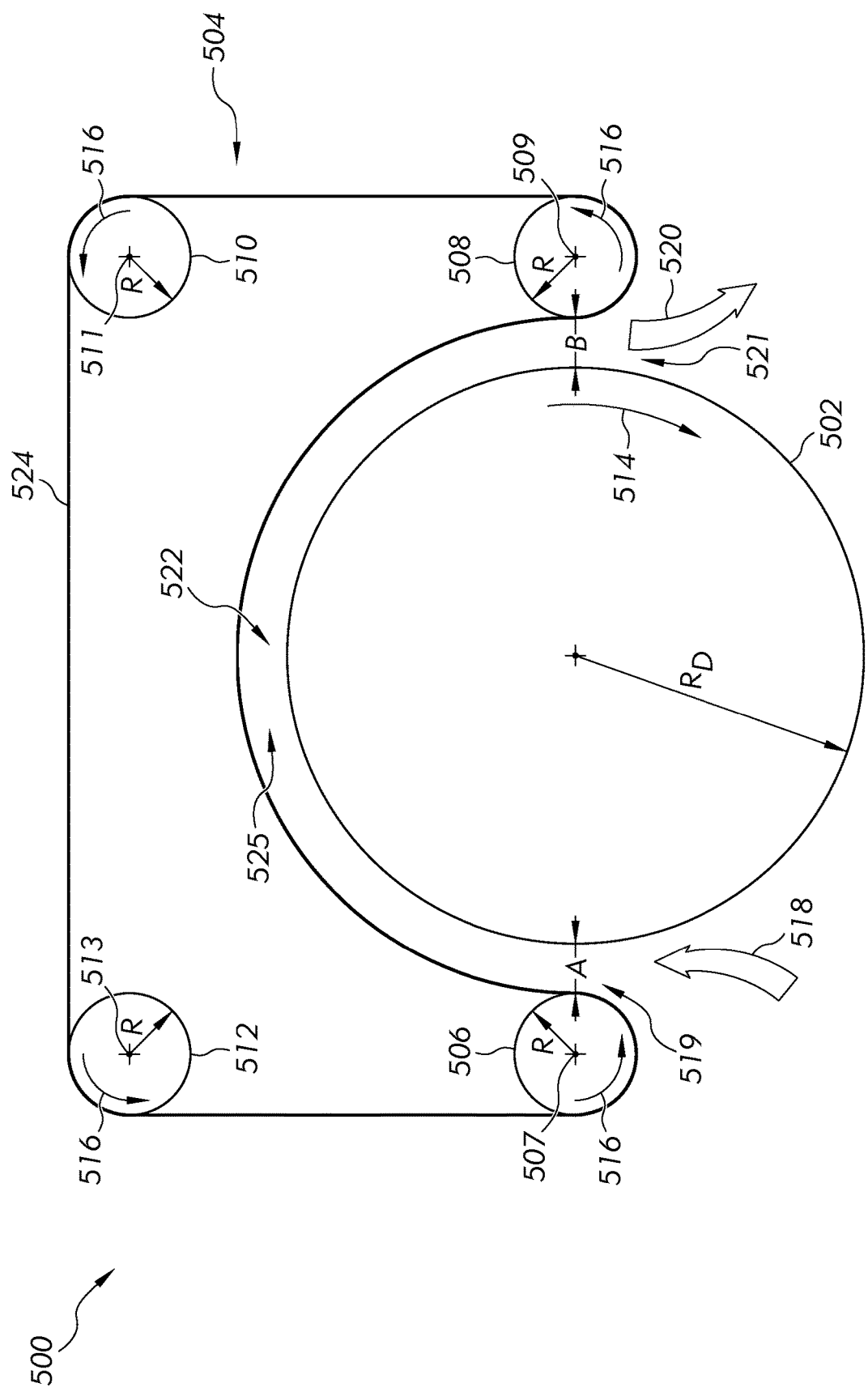
FIG. 5 is a schematic of a belt and drum macerator system.

Referring to FIG. 5, a different macerator system is shown. Unlike the flat platen macerator system of FIG. 4, the system in FIG. 5 is a drum and belt shredding macerator system 500. The system 500 may include a large drum 502 having a radius, RD. The system 500 may also include a belt system 504 formed by a plurality of rolls and an abrasive belt 524. The plurality of rolls may include a first roll 506, a second roll 508, a third roll 510, and a fourth roll 512. In the illustrated embodiment, each roll is shown having a radius, R, which is less than the drum radius, RD. Moreover, while each roll is shown having the same radius, it is to be understood that in other embodiments the radii of the rolls may differ. Further, there may be additional or fewer rolls in other embodiments than what is shown in FIG. 5.

The drum 502 may rotate in a first direction 514 as the plurality of rolls rotate in a second, opposite direction 516. For instance, the first direction 514 may be counterclockwise and the second direction 516 may be clockwise. In a further embodiment, the drum 502 may be held fixed such that it does not rotate. The first roll 506 may rotate about a first rotational axis 507, the second roll 508 may rotate about a second rotational axis 509, the third roll 510 may rotate about a third rotational axis 511, and the fourth roll 512 may rotate about a fourth rotational axis 513.

Although not shown, crop may be fed into the maceration system 500 of FIG. 5 via an inlet side 518. As it enters the from the inlet side 518, the belt 524 may be driven by the rolls such that the crop is fed into a maceration zone 522 between an outer surface of the drum 502 and the abrasive surface of the belt 524. The maceration zone 522 may be defined between (or in other words bounded by) the outer surface of the drum 502 and the belt 524. The maceration zone defines a continuous passageway 525. The passageway 525 includes a first end defining an inlet 519 of the passageway 525 adjacent the first rotational axis 507 and a second end defining an outlet 521 of the passageway 525 adjacent the second rotational axis 509. The inlet 519 may have a width defined by A between the belt 524 at the first roll 506 and the drum 502 and the outlet 521 may have a width defined by B between the belt 524 at the second roll 508.

The widths A and B may be substantially the same, or in another example, the width A may be larger than the width B. In any event, the maceration zone 522 is arc-shaped as depicted in FIG. 5 and thus represents a non-flat surface area by which crop may be macerated along a longitudinal or circumferential distance. In this embodiment, each roll may be operably driven by a motor or other power-generating device. It may be desirable to maintain the clearance between the belt 524 and drum 502 to be as small as possible to enhance the degree of maceration. Moreover, in the embodiment in which the drum 502 rotates in the first direction 514, it may be desirable to control the speed of the belt 524 and drum 502 to modify the degree of maceration.

Figure 6:
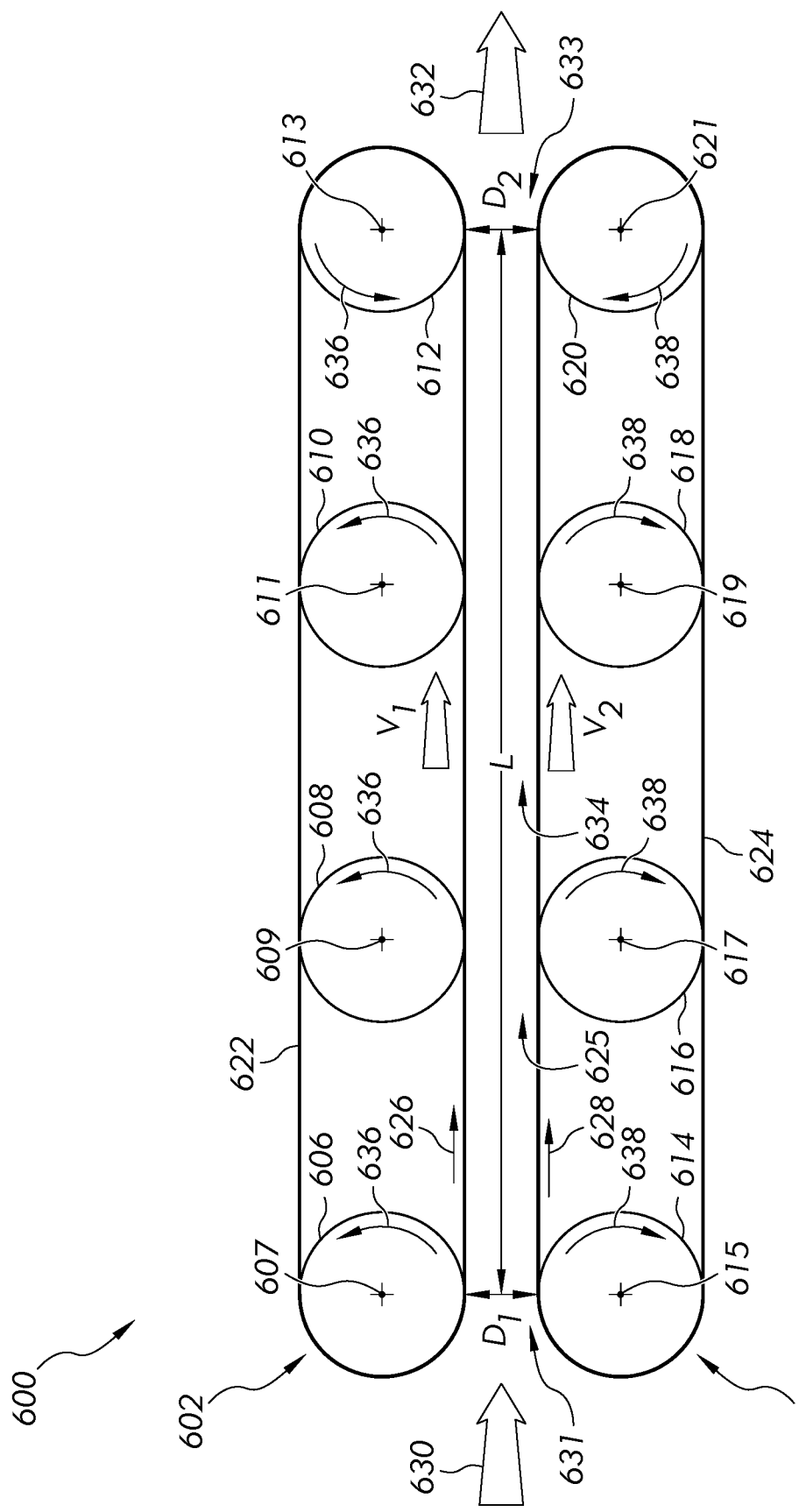
FIG. 6 is a schematic of a multi-roll and belt macerator system.

Turning now to FIG. 6, a different belt and roll shredding macerator system 600 is shown. In this system 600, a first macerator assembly 602 and a second macerator assembly 604 may be provided. Here, the first macerator assembly 602 may include a plurality of rolls including a first roll 606, a second roll 608, a third roll 610, and a fourth roll 612. Each of the rolls may be driven in a first rotational direction 636, as shown. In this example, the first rotational direction 636 corresponds with a counterclockwise direction. The first roll 606 is configured to rotate about the first rotational axis 607, the second roll 608 is configured to rotate about the second rotational axis 609, the third roll 610 is configured to rotate about the third rotational axis 611, and the fourth roll 612 is configured to rotate about the fourth rotational axis 613.

Each of the plurality of rolls may be operably driven by a motor or other power-generating device. A first belt 622 may be operably driven by the plurality of rolls, as shown.

The belt 622 may move in a forward or longitudinal direction 626 by the plurality of rolls and at a first speed or velocity, $V_1$. The first belt 622 may be an abrasive belt of industrial-type, or in other examples, it may be in the form of a chain with slats that run transverse to the longitudinal direction 626. In the example of a rigid steel chain, it may be possible to eliminate any backing support, plate, or other support frame from the system. Here, the steel belt may have sufficient rigidity such that there may be little to no slack and thus provide the desired macerating force to the crop.

In any event, the belt or chain forms an endless member for macerating crop through a maceration zone 634 along a longitudinal distance defined from an inlet 630 to an outlet 632 of the system 600.

The second macerator assembly 604 may also include a plurality of rolls like the first macerator assembly 602. Here, the second macerator assembly 604 may include a first roll 614, a second roll 616, a third roll 618, and a fourth roll 620. The plurality of rolls of the second macerator assembly 604 may be operably driven in a second rotational direction 638, which in FIG. 6 is in a clockwise direction. Thus, the plurality of rolls of the first macerator assembly 602 are rotatably driven in a direction opposite the plurality of rolls of the second macerator assembly 604. The first roll 614 is configured to rotate about the first rotational axis 615, the second roll 616 is configured to rotate about the second rotational axis 617, the third roll 618 is configured to rotate about the third rotational axis 619, and the fourth roll 620 is configured to rotate about the fourth rotational axis 621.

The plurality of rolls of the second macerator assembly 604 may also drive a second belt or chain 624 for macerating crop in the maceration zone 634. The belt or chain 624 can be driven in a second longitudinal direction 628 and at a second speed or velocity, $V_2$, as shown. In this example, the first and second longitudinal directions constitute the same direction. The first and second speeds or velocities, $V_1$ and $V_2$, may be controlled such that there is a differential speed between the two belts 622, 624.

In this system 600, the first belt 622 and second belt 624 may be disposed in close proximity to one another such that the crop enters the inlet side 630 where the clearance is defined as $D_1$, and the crop exits the maceration zone 634 at the outlet side 632 where the clearance is defined as $D_2$. The maceration zone 634 may have a length, L, where the crop is macerated between the two belts travelling at differential speeds. The level or degree of maceration may be modified by adjusting the differential speed between the belts, or by changing one or both belts to a different grit texture. At least in FIG. 6, the clearance at the inlet side 630 may be the substantially the same as the clearance at the outlet side 632.

Although not shown, crop may be fed into the maceration system 600 of FIG. 6 via the inlet side 630. As it enters the from the inlet side 630, the belts 622, 624 may be driven by the rolls such that the crop is fed into a maceration zone 634 between the belts 622, 624. The maceration zone 634 may be defined between (or in other words bounded by) the belts 622, 624. The maceration zone defines a continuous passageway 625. The passageway 625 includes a first end defining an inlet 631 of the passageway 625 adjacent the first rotational axis 607 and a second end defining an outlet 633 of the passageway 625 adjacent the fourth rotational axis 613.

Figure 7:
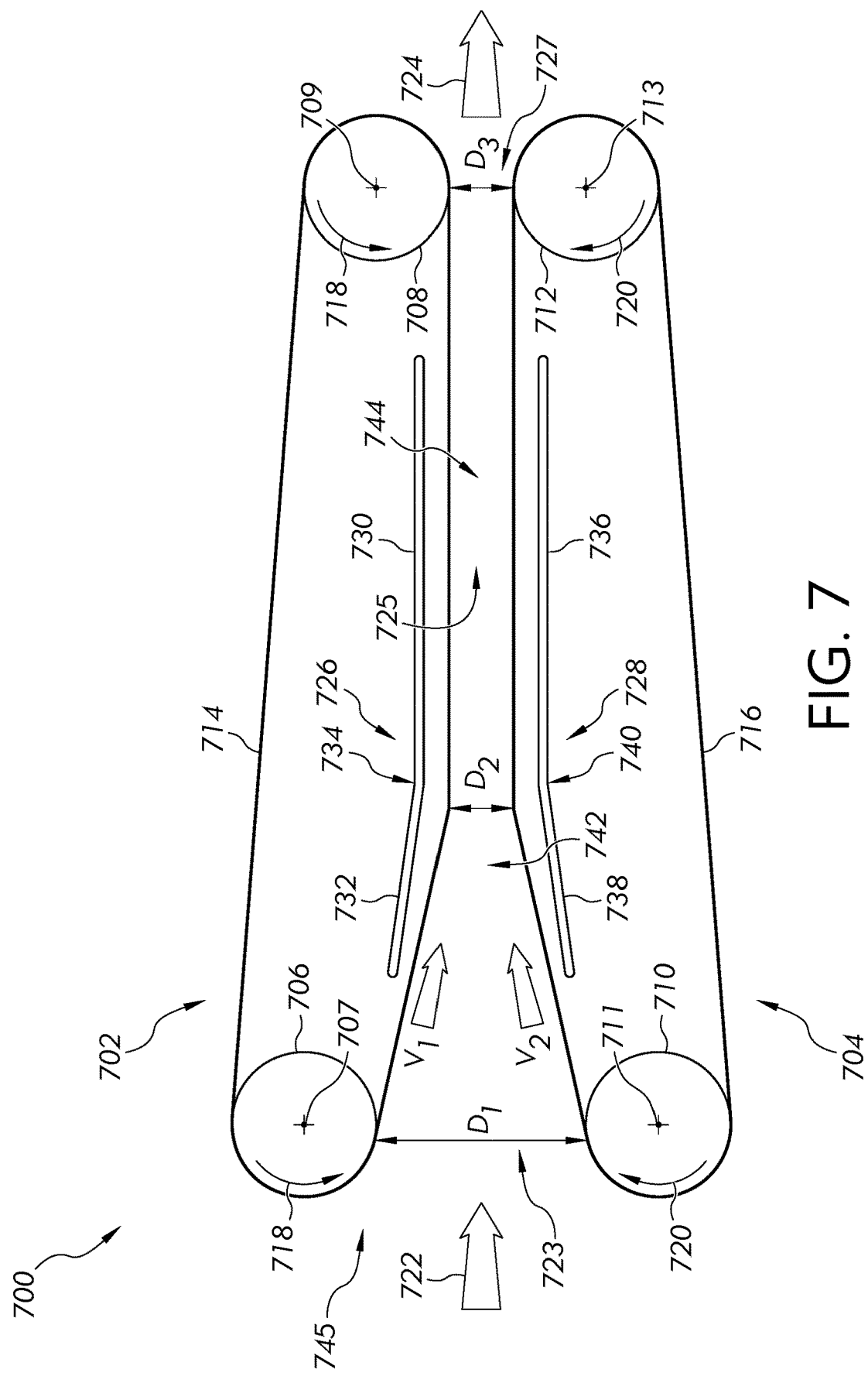
FIG. 7 is a schematic of a multi-roll and belt macerator system having a wedge-shaped processing zone.

Referring to FIG. 7, an alternative embodiment to that of FIG. 6 is shown. Here, a wedge-shaped platen maceration system 700 is illustrated. The system may include a first macerator assembly 702 and a second macerator assembly 704. The first macerator assembly 702 may include a first inlet roll 706 and a first outlet roll 708. The inlet roll 706 and outlet roll 708 may be operably driven by a motor or other power-generating device in a first rotational direction 718. In FIG. 7, the first rotational direction 718 corresponds with the counterclockwise direction. The inlet roll 706 is configured to rotate about a first rotational axis 707, and the outlet roll 708 is configured to rotate about a second rotational axis 709.

The first macerator assembly 702 may also include a first abrasive belt 714 which is operably driven at a first speed or velocity, $V_1$, and supported by the rolls. Further, the first macerator assembly 702 may include a first support frame 726. Unlike the support frame of FIG. 4, however, the first support frame 726 has an elongated body defined by a substantially horizontal first portion 730 and an angled second portion 732. The substantially horizontal portion 730 may be described as linear meaning that it extends in a straight line. Additionally, angled second portion 732 is disposed at an angle relative to the horizontal portion 730, yet the angled second portion 732 may be described as linear meaning that it extends in a straight line as well. The first portion 730 and second portion 732 diverge from one another at a first bend 734. The first belt 714 may be supported by the first support frame 726 as it is driven by the rolls. Moreover, the first support frame 726 may ensure that the belt 714 does not sag or flex in the area of a maceration zone formed by the system 700.

The second macerator assembly 704 may include a second inlet roll 710 and a second outlet roll 712. The inlet roll 710 and outlet roll 712 may be operably driven by a motor or other power-generating device (not shown) in a second or clockwise direction 720. The inlet roll 710 is configured to rotate about a first rotational axis 711, and the outlet roll 712 is configured to rotate about a second rotational axis 713. Here, the first and second directions are opposite from one another. A second abrasive belt 716 may be operably driven at a second speed or velocity, $V_2$, and supported by the rolls 710, 712 such that the first belt 714 and second belt 716 travel in the same longitudinal direction in the maceration zone.

The second macerator assembly 704 may also include a second support frame 728. The second support frame 728 has an elongated body defined by a substantially horizontal first portion 736 and an angled second portion 738. The first portion 736 and second portion 738 diverge from one another at a second bend 740. The second belt 716 may be supported by the second support frame 728 as it is driven by the rolls. Moreover, the second support frame 728 may ensure that the belt 716 does not sag or flex in the area of a full maceration zone 745 formed by the system 700. As such, the belt 716 may come into contact at one or more locations along its length with the support frame 728 to further give shape to the belt. The belt 716 may contact the support frame 728 along the entire length of the support frame 728. In some instances, the surface of the second support frame 728 may comprise a low friction material to help smooth travel of the belt along the frame 728. In other instances, the inside surface of the belt 716 which contacts the support frame 728 may be formed of a lower friction material as well. These features and arrangements also apply to the first belt 714 and first support frame 726 and the other embodiments described herein.

In the embodiment of FIG. 7, the full maceration zone 745 may be defined between an inlet side 722 through which crop enters and an outlet side 724 through which crop exits the zone. Further, the full maceration zone 745 may be divided into a first maceration zone 742 and a second maceration zone 744. In the first maceration zone 742, crop enters the inlet 722 having a first width or clearance, $D_1$. As the crop enters the first maceration zone 742, however, the distance between the belts 714, 716 begins to taper inwardly such that the clearance continuously decreases. This inward tapering of the first maceration zone 742 continues until the transition between the first and second maceration zones. At the exit of the first maceration zone 742 and entrance of the second maceration zone 744, the clearance or distance between the belts may be defined as $D_2$. As shown, $D_2$ represents a clearance that is smaller than $D_1$. As described above, it may be easier to feed crop into the inlet side 722 of the maceration system 700 due to the increased clearance, $D_1$, whereas the crop is more likely to experience greater maceration due to the decreased clearance of the second maceration zone 744. Moreover, at the exit of the second maceration zone 744, i.e., the outlet side 724, the clearance is represented as $D_3$. The clearance, $D_3$, may be the same as, smaller than, or larger than the clearance, $D_2$. The dimensions of $D_1$, $D_2$, and $D_3$ can be the same as, smaller than, or larger than each other in any arrangement or combination.

Alternatively, another feature of the system 700 of FIG. 7 is that the second maceration zone 744 may have a substantially constant clearance, $D_2$, through its entire longitudinal length. This ensures that the crop is subjected to a greater shearing effect and better maceration in this area than in the first maceration zone 742. For this reason, it may be desirable to design the second maceration zone 744 to have a greater longitudinal length than the first maceration zone 742.

Although not shown, crop may be fed into the maceration system 700 of FIG. 7 via the inlet side 722. The full maceration zone 744 may be defined between (or in other words bounded by) the belts 714, 716. The full maceration zone 745 defines a continuous passageway 725. The passageway 725 includes a first end defining an inlet 723 of the passageway 725 adjacent the first rotational axis 707 and a second end defining an outlet 727 of the passageway 725 adjacent the second rotational axis 709. The full maceration zone 745 includes a rectangular portion 744 and a wedge-shaped portion 742 adjacent the rectangular portion.

The maceration zones of FIGS. 4, 6 and 7 are illustrated as being substantially linear in a longitudinal direction. However, in other embodiments, these maceration zones may have a curvature or arc to the overall shape. Thus, it is not required for the maceration zones to be linear, and any desirable shape or orientation is possible.

Moreover, the characteristics described above with respect to the belt shredding maceration system 400 of FIG. 4 may be equally applied to the systems of FIGS. 5-7 or any deviation or combination thereof to achieve different degrees of maceration. Thus, changes in clearance between the belts, differential speeds, grit textures of the belts, surface area of the maceration zone, abrasion time in the maceration zone, and the force applied to the crop by the belts (or belt and chain in FIG. 5) may be made to modify the degree of maceration of the crop.

While a belt is described above with respect to the first and second belts in several of the above-described embodiments, it is to be understood that the belt may be any endless member including a chain or other known device. Further, the belts in the aforementioned embodiments may be capable of being driven in an oscillatory manner. For example, either belt in the aforementioned maceration systems may be oscillated in a lateral or side-to-side direction with respect to the other belt. It may be simply possible to move the belt only via the oscillatory movement. In doing so, it may be possible to further break down the plant stem and cell walls of the crop material.

It may also be desirable to use belts that can be easily removed and replaced. The interchangeability of the belts may improve the efficiency of each system and allow for greater productivity. Further, it may improve energy losses and the like in the system. In some embodiments, such as those in which the endless member is a chain or a belt, it may be desirable to remove the endless member, maintenance the endless member, and reintroduce the endless member in the macerator assembly in its original position. In other embodiments, it may be desirable to remove the first endless member and replace the first endless member with a second endless member.

The above-described embodiments of macerators and macerator systems may be incorporated at one or more locations in the overall farming or harvesting process. For example, any of the aforementioned embodiments or deviations therefrom may be incorporated at the time of cutting crop such as hay. The crop, for example, may be first cut in a field, fed into the macerator system where the crop material is shredded and then deposited on a conveyor belt or other mechanism where it is pressed into a mat.

The macerator system may also be incorporated into the forage harvester. For example, today crop is cut and discharged onto a field where it is able to at least partially dry. A forage harvester or baler may then come along to harvest the crop. The crop may be placed in a square or round bale, or a self-propelled harvester may collect the crop and chop it up further before the crop is placed in a bunk silo.

It may be possible to incorporate the macerator system into the harvester between the pickup unit of the baler and the baling chamber. In this example, the crop may be macerated after it is collected from the field but before the crop is formed into a bale. In the same or a further example, the macerator system may replace a conventional crop processor in the forage harvester. To do so, however, the harvester will require a redesign in an effort to incorporate the macerator system in place of the crop processor.

In a further embodiment, the macerator system may be designed as its own stand-alone system. In this embodiment, the macerator system may be used to macerate the crop before it is placed in the bunk silo.

In yet another embodiment, the macerator system of the present disclosure may be used to macerate the crop after it comes out of the bunk silo and before it is fed to cattle, for example. After the forage crop goes through a fermentation process, the crop's cell wall may be ruptured during maceration in order to fiberize the fibrous portions of the plant material to improve digestion. During the fermentation process, bacteria digests or eats sugars in the plant and excretes acids usually in the form of lactic acid. In the bunk silo, if the crop is able to sit in this acid during storage, this may further weaken the cell walls of the plant for rupturing during maceration to better fiberize the material. This again usually only happens during storage in a bunk silo. So, in this embodiment, the macerator system may be used in the process after the crop has been stored in the bunk silo and is ready to be fed to cattle or other animals.

As described above, the maceration process may be advantageously placed at any time between the cutting of the crop and feeding the animal. Moreover, it may be possible to incorporate the maceration process using any of the maceration systems described herein at two or more places in the overall process. There are, however, some considerations as to where maceration should take place.

For instance, there may be additional benefits to incorporating the maceration process further upstream in the harvesting process. This may be especially true for hay. At the point of cutting the crop and then macerating it, there is the benefit of faster drying time since all of the plant cell walls are ruptured and cannot prevent moisture loss. Moreover, in the bunk silo, because the plant cell walls are ruptured, sugars are readily available to the bacteria and so the fermentation process may go more quickly.

Another benefit to macerating the crop further upstream in the harvesting process is the ability to compact the crop better in the bunk silo. With better compaction, oxygen may be excluded or limited to facilitate better fermentation. As it is known, it is desirable to pack the crop quickly and more densely to exclude oxygen in order to improve fermentation.

If, however, the maceration process occurs further upstream in the harvesting process, the harvesting system may require modification. For instance, a baler or self-propelled harvester may need to be redesigned to include the maceration system. In addition, machines may need to be modified to pick up a mat of crop instead of a windrow. Some of these changes, particularly to the machine, can be expensive. Thus, if the overall goal is only to improve digestibility and not improving drying time, then it may be less disruptive and cheaper to incorporate the maceration system downstream of the overall harvesting process. Moreover, after the crop is in the bunk silo, the required capacity or power to operate the maceration system may be significantly lower than if the system were to be incorporated into a harvesting machine. One reason for this is because the maceration system would not require the same level of power to keep up chopping rotors in the harvester.

Another benefit of macerating downstream in the harvesting process is the ability to improve digestibility of other crops besides hay. For example, if the crop is macerated after it has been stored in the bunk silo, then other forage besides hay may be macerated to improve digestibility including that of a corn stalk (rather than a kernel), alfalfa, and other plant material fed to animals.

In an alternative embodiment of the present disclosure, it may be desirable to use a maceration system similar to the roll shredding macerator of FIG. 3 but, instead of using rolls, removable and interchangeable belts or other abrasive surfaces may be used. In conventional crop processors, the crop processor rolls may have grooves defined in the outer surface in a pattern or the like. Over time, the edges or patterns can become worn or dull, and it may require re-machining of the outer surfaces which is both time-consuming and costly. Moreover, crop processor rolls often require hardening and other processing steps. With an interchangeable belt, however, the belt can simply be removed and replaced quickly and at a much lower cost.

In the event the interchangeable belt is used in a maceration system similar to the one depicted in FIG. 3, each roll may be designed as a mandrel tube or the like with an endless member wrapped around it. The endless member may be in the form of an abrasive belt. Thus, unlike the platen macerator system of FIG. 4, the roll shredding macerator system may provide a series of nips where the crop is macerated. The benefit, of course, is the ability to quickly and efficiently replace the maceration surface. The endless member may be formed as a sleeve disposed around a drum or roller, similar to a conventional sanding drum.

In another example of this embodiment, a conveyor belt may be disposed below a roller having an abrasive sleeve or belt wrapped around it. Crop may be fed between the roller and the conveyor belt to undergo maceration. In this example, the crop is macerated only at the nip between the roller and belt. In yet another example, it may be possible to add more rollers with abrasive, interchangeable surfaces or belts adjacent to one another such that more nips are provided for better maceration.

In a further example, a pair of rollers may be disposed below one or more upper rollers, where each of the rollers has an interchangeable belt or abrasive surface. In this example, there is no conveyor belt, but rather the crop is fed in-between the rollers and is macerated at each nip formed between two of the plurality of rollers. In this example, a multiple roll or roller maceration system is provided in which the maceration surface is interchangeable and quickly removable for improved efficiency and productivity.

In yet a further example, it may be possible to use a maceration system in which sand paper or the like is wrapped around a roll or mandrel. It may further be possible to use a sander or sand paper on both sides of the crop as it is fed into the system. The maceration system may be further improved by increasing the number of nips or times in which the crop is macerated as its passes through the system.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural machine comprising:
a chassis:
a crop-cutting member coupled to the chassis; and
a crop-conditioning member coupled to the chassis and positioned rearward of the crop-cutting member, wherein the crop-conditioning member includes a first macerator assembly and a second macerator assembly spaced from the first macerator assembly, the first macerator assembly including;
a first roll including a first rotational axis about which the first roll rotates,
a second roll including a second rotational axis about which the second roll rotates, and
a first belt surrounding and engaged with the first roll and the second roll; and
a maceration zone bounded by the first belt and the second macerator assembly, wherein the maceration zone extends from the first axis to the second axis and the first axis is spaced from the second macerator assembly by a first distance and the second axis is spaced from the second macerator assembly by a second distance less than the first distance.

2. The agricultural machine of claim 1,
wherein the second macerator assembly includes a third roll including a third rotational axis about which the third roll rotates and includes a fourth roll including a fourth rotational axis about which the fourth roll rotates;
a second belt surrounding and engaged with the third roll and the fourth roll;
wherein the first belt is configured to rotate relative to the second belt to macerate crop disposed between the first belt and the second belt.

3. The agricultural machine of claim 2, wherein:
the maceration zone defines a continuous passageway extending a longitudinal distance between the first rotational axis and the second rotational axis.

4. The agricultural machine of claim 3, wherein the continuous passageway includes:
a first end defining an inlet of the continuous passageway adjacent the first rotational axis and the third rotational axis, and
a second end defining an outlet of the continuous passageway adjacent the second rotational axis and the fourth rotational axis.

5. The agricultural machine of claim 4, wherein:
the first roll has a first diameter, and
the second roll has a second diameter smaller than the first diameter.

6. The agricultural machine of claim 4, wherein the maceration zone is arc-shaped.

7. The agricultural machine of claim 6, wherein:
the first roll and the second roll are configured to rotate in a first direction, and
the second macerator assembly is a drum configured to rotate in a second direction opposite the first direction.

8. The agricultural machine of claim 4, wherein the maceration zone is rectangular.

9. The agricultural machine of claim 4, wherein the maceration zone is wedge-shaped.

10. The agricultural machine of claim 4, wherein the maceration zone includes a rectangular portion and a wedge-shaped portion adjacent the rectangular portion.

11. The agricultural machine of claim 10, wherein:
the inlet of the continuous passageway is defined in the wedge-shaped portion of the maceration zone, and
the outlet of the continuous passageway is defined in the rectangular portion of the maceration zone.

12. The agricultural machine of claim 2, wherein the first macerator assembly includes a support frame that includes a first end and a second end, wherein:
the support frame is positioned between the first roll and the second roll, and
the support frame is surrounded by and configured to engage the first belt.

13. The agricultural machine of claim 12, wherein:
the support frame is configured to engage the first belt along an entire length of the support frame defined between the first end and the second end of the support frame.

14. The agricultural machine of claim 12, wherein the support frame is configured to engage the first belt at one or more discrete locations of the support frame.

15. The agricultural machine of claim 12, wherein:
the support frame includes a first substantially linear portion configured to engage the first belt,
the support frame includes a second substantially linear portion configured to engage the first belt, and
the second substantially linear portion is disposed at an angle relative to the first substantially linear portion.

16. The agricultural machine of claim 2, wherein the second macerator assembly is substantially identical to the first macerator assembly.

17. A crop-conditioning member for use with an agricultural machine, the crop-conditioning member comprising:
a first macerator assembly including:
a first roll including a first rotational axis about which the first roll rotates,
a second roll configured to rotate about including a second rotational axis about which the second roll rotates, and
a first belt surrounding and engaged with the first roll and the second roll;
a second macerator assembly spaced apart from the first macerator assembly; and
a maceration zone bounded by the first belt and the second macerator assembly;
wherein the first belt is configured to rotate relative to the second macerator assembly to macerate crop disposed between the first belt and the second macerator assembly, wherein the maceration zone extends from the first axis to the second axis and the first axis is spaced from the second macerator assembly by a first distance and the second axis is spaced from the second macerator assembly by a second distance less than the first distance.

18. The crop-conditioning member of claim 17, wherein the maceration zone defines a continuous passageway extending from an inlet defined adjacent to the first rotational axis at the first distance to an outlet defined adjacent to the second rotational axis at the second distance.

19. A method of macerating a crop, the method comprising:
rotating a first endless member of a first macerator assembly around a first roll having a first axis of rotation and around a second roll having a second axis of rotation rotating in a first direction;
advancing the crop into a maceration zone, wherein:
the maceration zone is bounded by the first endless member and a second macerator assembly spaced apart from the first endless member, wherein the second macerator assembly includes a second endless member rotating in a second direction opposite the first direction, and
the maceration zone extends a longitudinal distance between the first axis of rotation and the second axis of rotation; and
contacting the crop with the first endless member and the second endless member of the second macerator assembly in the maceration zone, wherein a clearance along a first portion of the longitudinal distance continuously decreases.

20. The method of claim 19 wherein the contacting the crop further includes wherein a clearance of a second portion of the longitudinal distance is substantially constant.

* * * * *